July 25, 1967  S. W. GEORGE  3,332,306
TOOL HOLDER
Filed Nov. 12, 1964  3 Sheets-Sheet 1
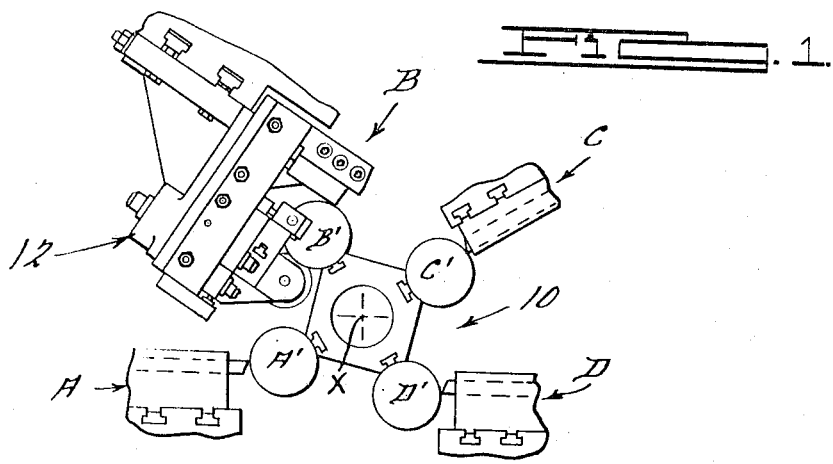
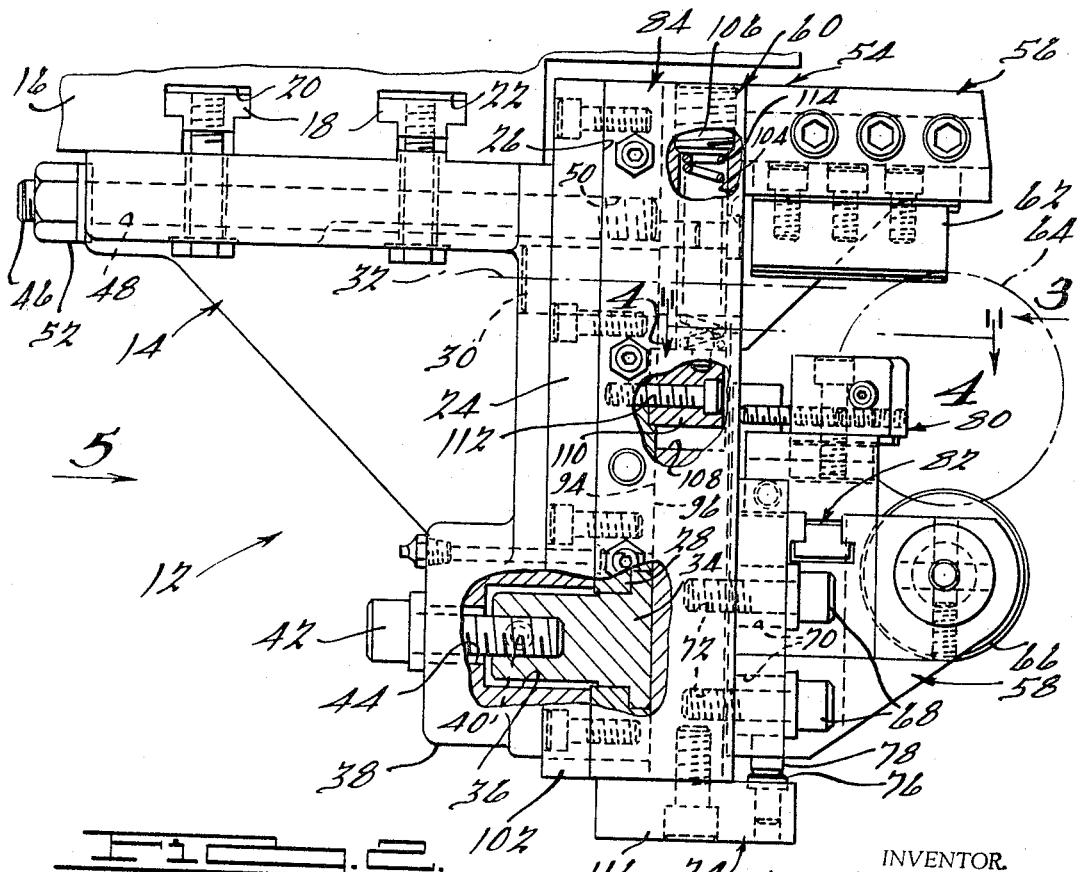
INVENTOR.
Stuart W. George
BY
Harness, Dickey & Pierce
ATTORNEYS.

July 25, 1967 S. W. GEORGE 3,332,306
TOOL HOLDER
Filed Nov. 12, 1964 3 Sheets-Sheet 2
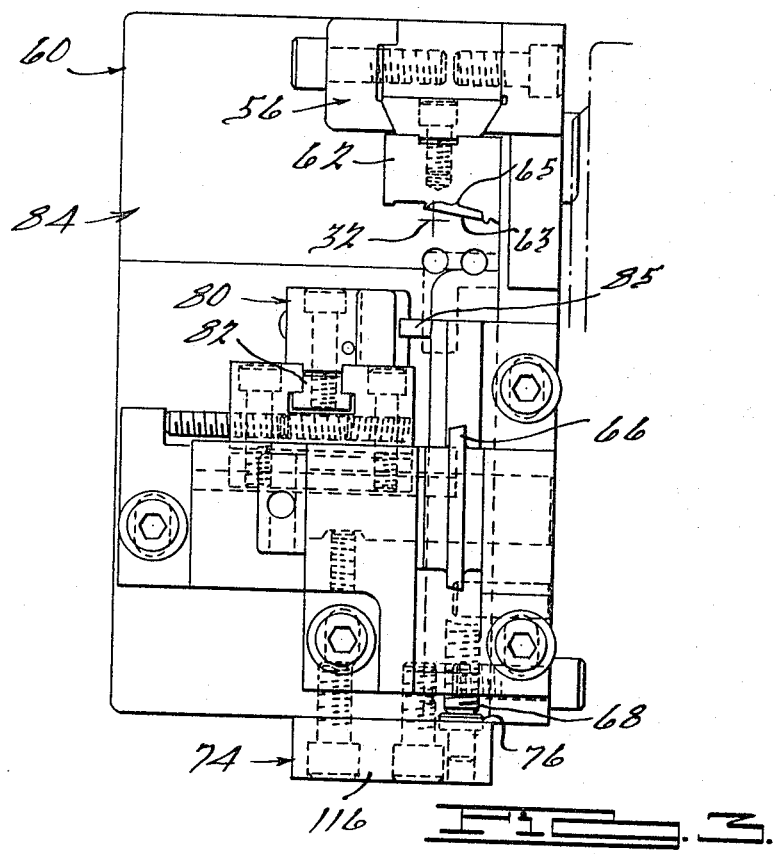
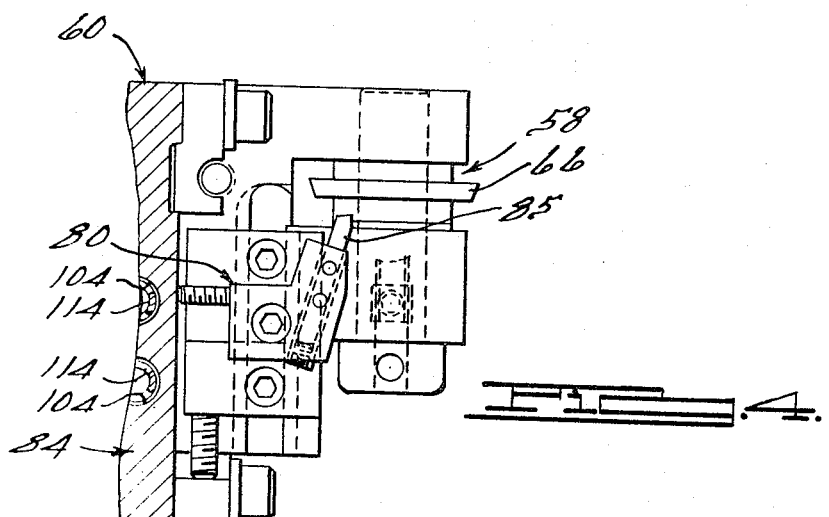
INVENTOR.
Stuart W. George
BY
Harness, Dickey & Pierce
ATTORNEYS.

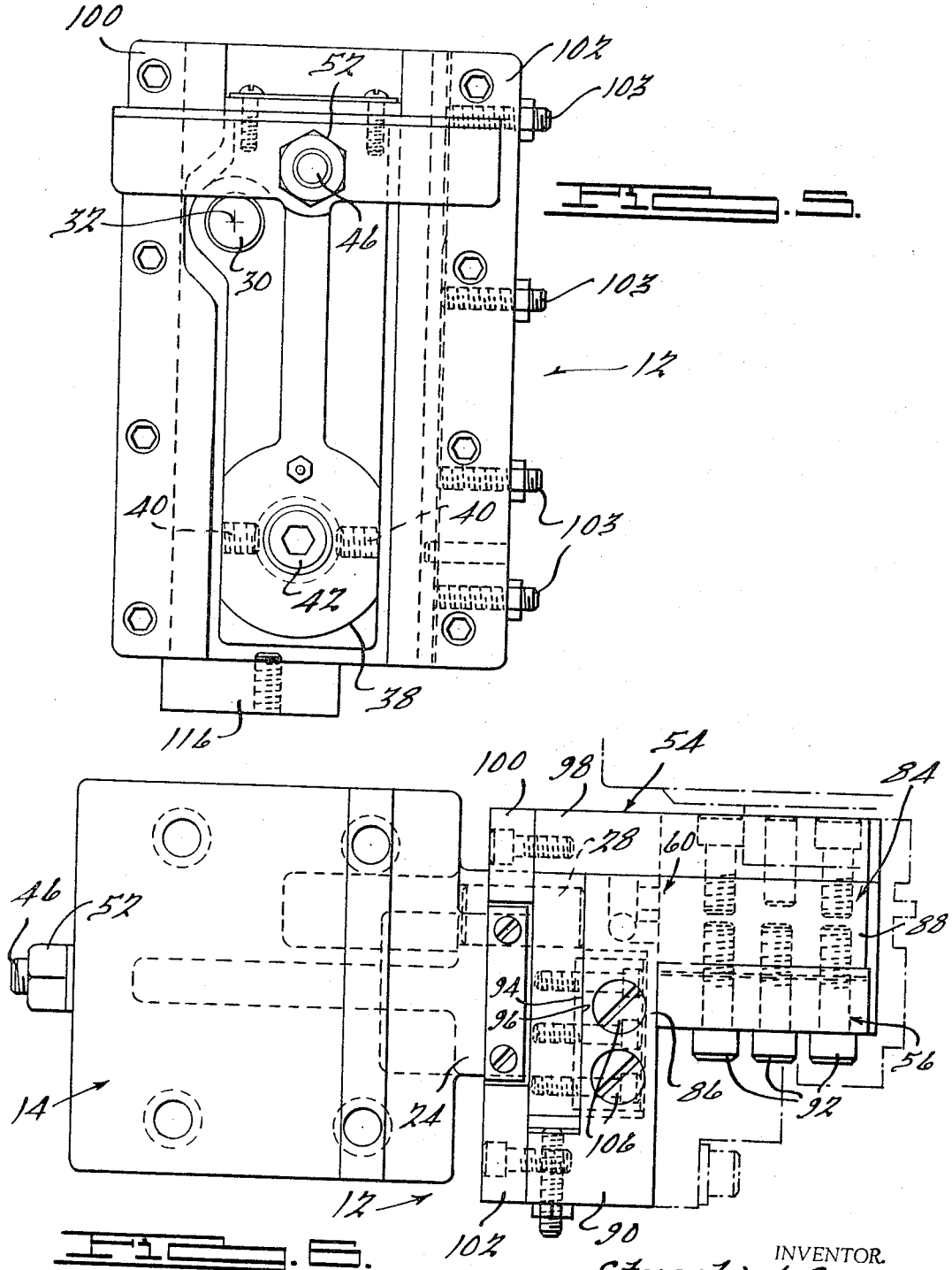

United States Patent Office

3,332,306
Patented July 25, 1967

3,332,306
TOOL HOLDER
Stuart W. George, Grosse Pointe Farms, Mich., assignor to Federal-Mogul Corporation, a corporation of Michigan
Filed Nov. 12, 1964, Ser. No. 410,491
1 Claim. (Cl. 82—35)

The present invention relates to tool holders, and more specifically to shaving tool holders for use on automatic screw machines.

The present invention is shown and described in conjunction with shaving tool holders for use on automatic screw machines which are used, for example, for sizing the OD on the inner race of a roller bearing assembly. Oftentimes it is necessary to change the angle of taper at which the OD of the inner race is cut. With past constructions this is an involved operation requiring a substantial amount of time and hence resulting in substantial downtime of the machine. In the present invention these adjustments can be quickly made reducing the amount of downtime.

Therefore, it is an object of the present invention to provide an improved tool holder.

It is another object of the present invention to provide an improved shaving tool holder for cutting a taper on a circular part in which the angle of the taper can be quickly and easily changed.

It is an object of the present invention to provide an improved shaving tool holder for use on automatic screw machines for finishing or sizing the OD of a circular part in which the angle of taper in sizing the OD can be quickly and easily changed.

Other objects, features, and advantages of the present invention will become apparent from the subsequent description and the appended claim, taken in conjunction with the accompanying drawings, in which:

FIGURE 1 is a fragmentary view of an automatic screw machine with the shaving tool holder of the present invention shown in assembly relation therewith;

FIGURE 2 is a side elevational view of the shaving tool holder of the present invention with some parts shown broken away and others shown in section;

FIGURE 3 is a front elevational view of the tool holder of FIGURE 2 taken generally in the direction of the arrow 3;

FIGURE 4 is a cross sectional view of the tool holder of FIGURE 2 taken substantially along the line 4—4;

FIGURE 5 is a rear elevational view of the tool holder of FIGURE 2 taken generally in the direction of the arrow 5; and FIGURE 6 is a plan view of the shaving tool holder of FIGURE 2.

Looking now to FIGURE 1, an automatic screw machine is partially shown only and is indicated generally by the numeral 10 and comprises a plurality of work stations A–D, and a like plurality of spindles A'–D' which are rotatable about their individual axes. The spindles A'–D' in turn are also rotatable about an axis X, whereby each spindle A'–D' can be moved to each of the work stations A–D whereby the various operations can be successively performed on each workpiece held.

The present invention is directed to a shaving tool holder generally indicated by the numeral 12 and shown at work station B in FIGURE 1. A shaving tool holder is used for precision sizing of an annular surface and, in general, permits the tool to shave just enough so that the workpiece will pass between the tool and an associated roller. In the form shown in the drawing, the shaving tool holder is used for finishing the OD of an inner ring for a roller bearing assembly, which OD would be the inner raceway.

The shaving tool holder 12 includes a rigid base member 14 which can be secured to a tool slide structure 16 which is connected with the structure of the screw machine 10 in a conventional manner whereby the shaving tool holder 12 can be moved towards and away from workpieces held on spindles A'–D' as these spindles are successively located at the work station B. The base 14 is secured to the support structure 16 by means of a plurality of T-nut assemblies 18 which cooperate with T-shaped slots 20 and 22 whereby movement of the base 14 and hence of the entire tool holder 12 can be made to selected positions.

The base member 14 has a forwardly extending attachment portion 24 which has a generally flat forward face 26. Pivotally secured to the flat forward face 26 of attachment portion 24 is a pivot plate 28. A pivot pin 10 extends through the attachment portion 21 of base member 14 and also into the pivot plate 28 whereby the pivot plate 28 can be pivoted relative to the base member 14 about the axis of the pivot pin 20. The pin 30 and the axis 32 are located near the upper end of the base member 14 for a purpose to be described.

A generally cylindrical plug 34 is pressed into an opening near the bottom of the pivot plate 28 and extends rearwardly into an enlarged cavity 36 in a boss 38 near the lower end of the base member 14. Since the plug 34 has clearance with the cavity 36, is can be appreciated that it is possible to pivot the pivot plate 28 about the axis 32 at least to the extent of this clearance. A pair of set screws 40 are diametrically, oppositely located in the boss 38 and extend into the cavity 36 and are engageable with the plug 34 whereby the movement of the plug 34 can be limited and hence the angular position of the pivot plate 28 about the axis 32 can be fixed. Thus by simply adjusting the set screws 40, the pivot plate 28 can be pivoted about the axis 32 to any position permitted by the relative clearance between the parts.

In order to better secure the pivot plate 28 at the selected positions, a bolt 42 is threadably engaged with the rearward end of the plug 34 and extends in clearance relationship through a bore 44 which communicates with a cavity 36 from the rearward end. By simply tightening the bolt 42 the pivot plate 28 will be drawn up tight against the flat forward face 26 of the attachment portion 24, and hence a selected position will be maintained. The pivot plate 28 is likewise clamped to the flat forward face 26 of the attachment portion 24 by means of an elongated stud 46 which extends through a slightly enlarged bore 48 in the base member 14 in clearance relation and has its forward end threadably engaged with a threaded bore 50 through the pivot plate 28. The stud 46 extends slightly above and is proximate to the pivot pin 30. Clamping is provided by means of a nut 52 which is threaded on the rearward end of stud 46 and bears against a rear surface of the base member 14. Thus, in order to provide for a change in angular position of the pivot plate 28, bolt 42 and nut 52 are loosened, the appropriate adjustment is made by means of the set screws 40 and the stud 42 and nut 52 are retightened to thereby positively clamp the pivot plate 28 in the desired position. Note that the clearance provided between the stud 46 and the through bore 48 is only slight; however, it is to be appreciated that the adjustments to be made in the angular position of the pivot plate 28 are likewise only slight, i.e., normally being seconds or minutes.

A cutting tool holder assembly 54 is supported upon the pivot plane 28 in a manner to be described. The cutting tool holder assembly 54 includes a cutting tool subassembly 56 and an adjustable roller subassembly 58, both of which are secured to a slide subassembly 60. The cutting tool subassembly 56 includes a conventional cutting tool 62 having a cutting edge 63 for cutting the outside diameter of a circular workpiece generally indicated in dotted lines and designated by the number 64. The cutting edge 63 includes an inclined taper cutting portion 64. The roller assembly 58 includes a roller member 66 which is spaced from the cutting edge 63 of the cutting tool 62 such that as the workpiece 64 is moved in between the roller 66 and tool 62, the cutting edge 63 will shave or trim the outside diameter of the part 64 to the extent sufficient to permit the workpiece 64 to pass therethrough. This dimension can be set by adjusting the height of the roller 66 relative to the cutting edge 63 of the tool 62.

Looking now to FIGURE 2, the roller subassembly 58 is secured to the slide subassembly 60 by means of a plurality of bolts 68 which extend through clearance holes 70 in the roller subassembly 58 and are threadably engaged in threaded bores 72 in the slide subassembly 60; by merely loosening the bolts 68 and moving the roller subassembly 58 along the slide subassembly 60, the distance between the roller 66 and the cutting tool 62 can be set. The distance can be precisely fixed by means of a locating subassembly 74, which is fixed to the lower edge of the slide subassembly 60 and includes a locating button 76 which is engageable with a locating stop 78 in the bottom of the roller subassembly 58. The position of the button 76 can be selectively adjusted such that when the stud 78 engages the top of the locating button 76, the desired distance between the roller 66 and the cutting tool 62 is provided. With the desired distance set, the bolts 68 are tightened to fix the roller assembly 58 in place.

In order to face one end of the workpiece 64 as the OD is being sized, a facing tool subassembly 80 is secured to roller subassembly 58 and is provided to be slidably movable thereon toward or away from the desired position of the workpiece 64 by means of a T-slide assembly indicated by the numeral 82. The facing tool subassembly 80 includes an appropriate cutting tool 85.

The slide subassembly 60 includes a generally Z-shaped member 84 having a straight intermediate portion 86 and a pair of leg portions 88 and 90. The tool subassembly 56 is secured to the leg portion 88 via a plurality of bolts 92 while the rear face 94 of the intermediate portion 86 is generally maintained in slidable engagement with the forward face 96 of the pivot plate 28. A side member 98 is secured to the leg portion 88 and generally extends rearwardly beyond the intermediate portion 86 to overengage a side surface of the pivot plate 28. In a like manner the leg portion 90 generally overengages the opposite side surface of the pivot plate 28. A pair of backing plates 100 and 102 are secured to the rear surfaces of the side member 98 and of the leg portion 90, respectively, and are provided to generally partially overengage the rear surface of the pivot plate 28. Thus the backup plates 100 and 102, the leg portion 90, the side member 98 and the rear face 94 of the intermediate portion 96 define a channel which generally, slidably fits over the pivot plate 28 and hence which permits up-and-down sliding motion of the slide subassembly 60 relative to the pivot plate 28. A plurality of adjustable stud assemblies 103 extend through the leg portion 90 and are engageable with the corresponding side of the pivot plate 28; thus the side-to-side clearance between the pivot plate 28 and the confronting surfaces of the slide subassembly 60 can be minimized simply by adjusting the stud assemblies 103.

The intermediate portion 86 is provided with a pair of downwardly extending bores 104 each of which are capped with a threaded plug 106; the bores 104 communicate with a cavity 108 located in the back surface 94 of the intermediate portion 86 and located intermediate the upper and lower ends of the intermediate portion 86. A stop block 110 is secured at the forward face 96 of the pivot plate 28 via a plurality of studs 112 and extends in clearance relationship into the cavity 110. A pair of springs 114 are located in the vertical bores 104 and are placed under a precompressive load by means of the plugs 106. As a result of this compressive force on the springs 114, the slide subassembly 60 is normally urged upwardly relative to the pivot plate 28 and the block 110. However, the locating subassembly 74 has a bottom plate 116 which overengages the bottom surface portion of the pivot plate 28 and hence limits the upward movement of the slide subassembly 60.

In practice, the workpiece 64 would be located upon one of the spindles of the automatic screw machine at one of the work stations and particularly the work station B as shown in FIGURE 1. The tool holder 12 as located on the slide 16, is movable towards and away from the spindle B' and as the spindles A'–D' are indexing about the axis X the tool holder 12 is in its retracted position or, in other words, is in a position out of engagement with the associated workpieces. However, as the spindles A'–D' are located in their proper positions, the tool holder 12 via the slide 16 moves toward the particular spindle A'–D' to engage the particular workpiece located thereat. It can be appreciated that the positional relationship of the individual workpieces on the spindles A'–D' could vary slightly; in order to compensate for these slight variations, the slide subassembly 60 is provided to be resiliently movable such that it can compensate for these variations and attain the proper position. Hence, as the tool holder 12 moves toward the spindle B' and into engagement with the workpiece 64, the slide subassembly 60, with the cutter 62, will be located in its uppermost position as shown in FIGURE 2. However, as the roller 66 engages the workpiece 64, the slide subassembly 60 is free to move downwardly to the proper position to move the workpiece 64 between the roller 66 and cutter 62; thus slight positional variations between one workpiece and another will automatically be compensated.

Oftentimes it is desirable to be able to change the angle of the taper as cut by the inclined portion 65 of the cutting edge 63 of tool 62 on the outside diameter of a workpiece such as workpiece 64. With the tool holder 12 of the present invention it is necessary only to loosen the stud 42 and the nut 52 and to adjust the set screws 40 until the desired angular relationship is attained. Note that the pivoting occurs about the axis 32 which is quite proximate to the cutting edge of the tool 62 and specifically to the inclined portion 65 and generally extends transversely to the cutting edge 63. As shown in FIGURE 3, the axis 32 is spaced below the portion 65. However, note that the slide subassembly 60 and hence cutting tool subassembly 56 are located in their uppermost positions and that during cutting of a workpiece these subassemblies would be in lower positions, i.e., as a result of spring action of springs 114, etc.; hence the axis 32 would more or less intersect the inclined portion 65, depending upon the amount of sliding movement required by the slide subassembly 60. Since the slight angular adjustments are made about the axis 32 which is proximate to the inclined portion 65, these adjustments can be made without requiring complete readjustment of the tool holder 12 relative to the slide 16. In the past, with shaving tool holders, angular adjustments have been provided by pivoting the tool holder at generally any convenient point. However, it can be appreciated that in doing so, if the pivot point is too remote from the cutting edge 63 of the tool 62, the tool 62 is moved through a substantial arc and hence will require additional adjustments along the slide 16, etc., to be in the proper position for the workpieces. With the present invention it can be seen that slight angular changes can be made quite readily by means of the structure provided without the need for additional adjustments, thus reducing the downtime of the automatic screw machine.

While it will be apparent that the preferred embodiment of the invention disclosed is well calculated to fulfill the objects above stated, it will be appreciated that the invention is susceptible to modification, variation and change without departing from the proper scope or fair meaning of the subjoined claim.

What is claimed is:

A shaving tool holder for use on an automatic screw machine and having a tool for cutting a radial surface on a workpiece with the tool having a cutting edge with a tapered portion, said tool holder comprising: a base member, a pivotal member, a slide assembly supported on said pivotal member for up-and-down sliding motion, means on said slide assembly for supporting the tool at a selected location, a roller, means on said slide assembly for supporting said roller a preselected distance from the cutting edge of the tool whereby the radial surface of the workpiece is cut as the workpiece is moved between said roller and the cutting edge of the tool, pivot means for pivotally supporting said pivotal member on said base member for selected pivotal movement and pivotal positioning about a pivot axis located close to and extending transversely to the tapered portion of the cutting edge of the tool whereby the angle of the taper cut on the radial surface of the workpiece can be selectively set, said pivot means including a pivot pin connecting said pivotal member and said base member with the axis of said pivot pin being said pivot axis, first clamping means located proximate to said pivot pin for clamping said pivotal member and said base at the selected position, second clamping means located at a point substantially removed from said first clamping means and said pivot pin for clamping said pivotal member and said base at said selected position, means operatively connected with said second clamping means for selectively setting said selected position, and means connecting said slide assembly and said pivotal member for resiliently permitting said up-and-down sliding motion whereby variations in the positional location of different workpieces relative to said shaving tool holder can be compensated.

References Cited

UNITED STATES PATENTS

| | | | |
|---|---|---|---|
| 512,564 | 1/1894 | Rapp | 82—35 X |
| 1,375,785 | 4/1921 | Drowns | 82—35 |
| 1,624,888 | 4/1927 | Cook | 82—35 |
| 2,041,251 | 5/1936 | Klein | 82—35 |

WILLIAM W. DYER, JR., *Primary Examiner.*

LEONIDAS VLACHOS, *Examiner.*